United States Patent Office 3,470,743
Patented Oct. 7, 1969

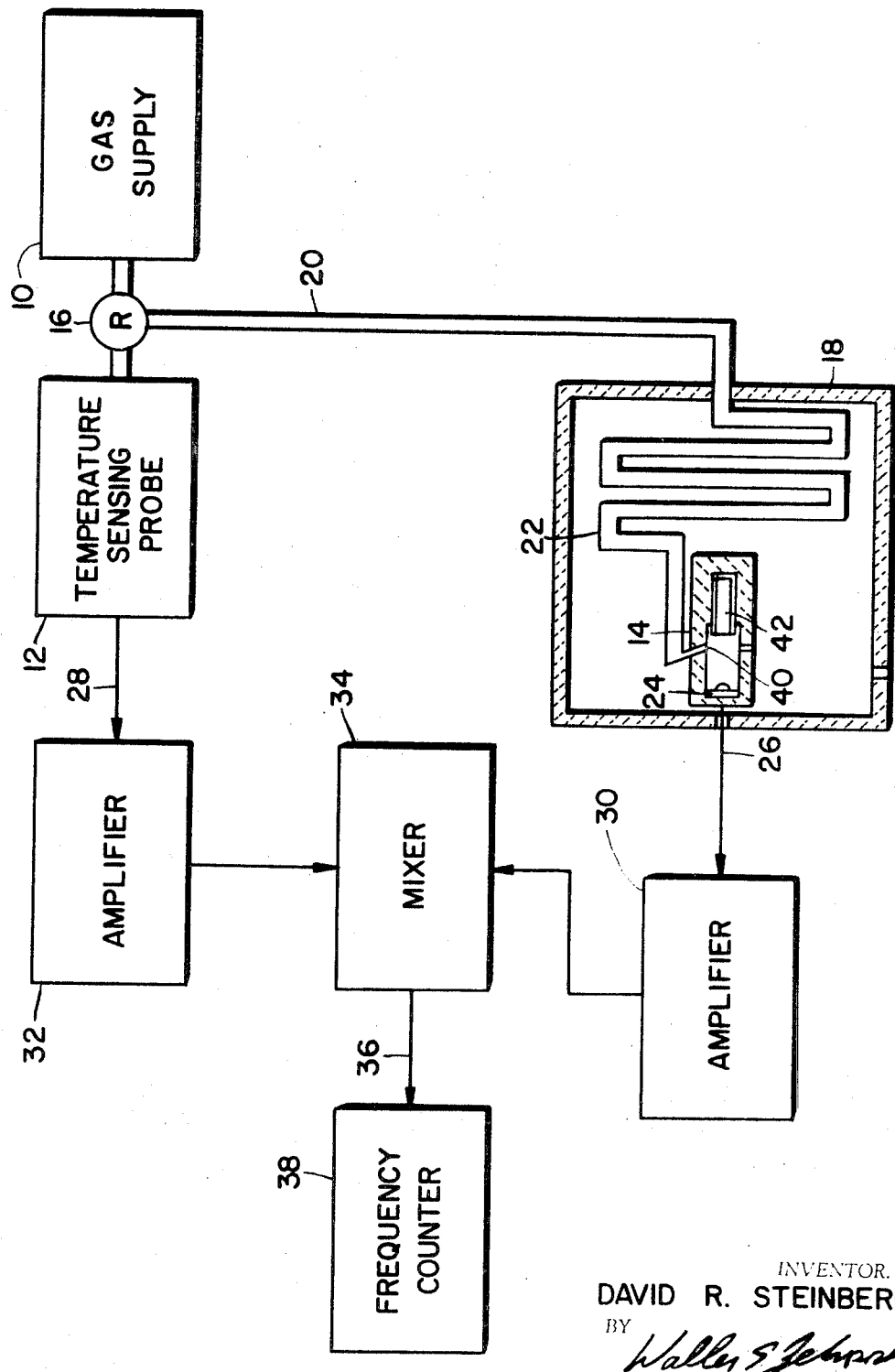

3,470,743
SYSTEM FOR MEASURING TEMPERATURE
David R. Steinberg, Raleigh, N.C., assignor to Corning Glass Works, Corning, N.Y., a corporation of New York
Filed Oct. 20, 1967, Ser. No. 676,875
Int. Cl. G01n 9/00
U.S. Cl. 73—340                             5 Claims

ABSTRACT OF THE DISCLOSURE

A temperature measuring system containing two resonant cavity oscillators, one being a temperature sensing probe, the other being a comparison standard. Gas from a single source drives both oscillators. The comparison standard oscillator is driven through a heat exchanger, both being located in a constant temperature oven. The temperature sensing probe is driven directly from the gas source. The difference between the two oscillator output signal frequencies is proportional to probe temperature. Error caused by gas pressure variation is cancelled without the necessity of using elaborate and precise gas pressure regulation.

BACKGROUND OF THE INVENTION

This invention relates generally to gas driven temperature sensing devices and more particularly to a system for the elimination of errors caused by gas pressure variations in such devices but is in no way limited thereto.

One example of a temperature sensing device utilizing a resonant cavity sonic oscillator is described in my co-pending application, Ser. No. 589,367 entitled System for Measuring Temperature, filed Oct. 25, 1966, now Patent No. 3,427,881, issued Feb. 18, 1969. That invention provides the advantage of temperature sensing wherein the effects of aging of component parts of the device are negligible, construction is easily accomplished using high temperature materials, and highly reliable measurements over a wide range of temperatures are possible.

However, I have found that the pressure of the gas supplied to the resonant cavity oscillator must be precisely regulated in order to give high accuracy temperature measurements. This is because the oscillator output signal frequency generated by the gas passing through the cavity is a function of both temperature and driving gas pressure.

This problem is dealt with in the above mentioned invention through use of a pressure regulating system composed of a flow regulator, pressure regulator, heat exchanger, and pressure reducing nozzle. But such an open loop regulation system can only minimize error due to pressure variation, not eliminate it. Care is still required in the choice of an external driving gas supply having reasonably good pressure stability characteristics.

SUMMARY OF THE INVENTION

It is an object of the instant invention to provide means for cancelling the effects of pressure variation errors in gas driven temperature sensing systems.

It is also an object of the instant invention to provide means for eliminating pressure variation errors in gas driven temperature sensing systems without resorting to the elimination of gas pressure variation.

It is a further object of the instant invention to provide for a wider range of compensation for the effects of gas pressure variations in gas driven temperature sensing systems than is ordinarily available using conventional open loop gas pressure regulation.

Briefly, in accordance with the instant invention, a gas driven temperature sensing system and a gas driven temperature comparison standard, each producing output signals whose frequencies are a function of temperature and driving gas pressure, are connected to a common gas source. The gas driven comparison standard and the driving gas therein is maintained at a single fixed temperature. The difference in frequency between the output signals of the temperature comparison standard and the temperature sensing system is detected.

Since frequency shift in each output signal, attributable to driving gas pressure variation is equal, error induced by pressure variation is thereby cancelled. The difference in frequency between the two output signals therefore provides a measure of relative temperature difference between the temperature comparison standard and the temperature sensing system.

Additional objects, features, and advantages of the instant invention will become apparent to those skilled in the art, from the following detailed description and attached drawing, on which, by way of example, only the preferred embodiment of the instant invention is illustrated.

BRIEF DESCRIPTION OF THE DRAWING

The drawing is a functional block diagram of a system for eliminating gas pressure variation in a gas driven temperature sensing system illustrating one embodiment of the instant invention.

DESCRIPTION OF THE PREFERRED EMBODIMENT

Referring to the diagram there is shown a gas supply 10 coupled through a gas pressure regulator 16 to a gas driven temperature sensing probe 12, and a resonant cavity oscillator temperature comparison standard 14. The temperature sensing probe 12 and the comparison standard oscillator 14 may be of any type capable of producing mechanically vibrating signals whose frequencies are a function of driving gas temperature such as the type disclosed in my above mentioned co-pending application, or the like. Such signals may be detected or sensed directly by means of fluidic components and systems. Or, as is often the case, they may be converted into corresponding electrical signals by means of a microphone, dynamic pressure transducer, or the like and detected or sensed in that form by any suitable means well known in the art. The gas pressure regulator 16 need only be of sufficient quality to insure that driving gas pressure variations do not exceed the range of pressures for which the temperature sensing probe 12 and comparison standard oscillator 14 have the capacity to respond.

The comparison standard oscillator 14 is maintained at constant temperature. To accomplish this, the comparison standard oscillator 14 is housed in a constant temperature oven 18 which need be adjusted to a temperature only slightly higher than the highest ambient temperature extreme. Ordinarily a constant temperature in the range of 60° C. to 80° C. is sufficient. It is desirable, though not essential, to operate the comparison standard oscillator 14 at relatively low temperatures so as to permit the use of low temperature materials and generally simpler design than is ordinarily required in the temperature sensing probe 12.

In cases where there is substantial difference between driving gas temperature and the temperature of the oven 18, or where gas temperature variations are appreciable, it may be necessary to couple the driving gas from the gas line 20 to the comparison standard oscillator 14 through a heat exchanger 22, which is located within the oven 18. With the driving gas entering the comparison standard oscillator 14 at a constant temperature, the mechanically vibrating output signal of the oscillator 14 varies only with driving gas pressure variation. By means of a suitable transducer 24 such as a microphone, dynamic pressure transducer, or the like this signal is converted into a corresponding electrical output signal, represented in the drawing by an arrow 26. An electrical output signal represented in the drawing by an arrow 28, is produced by the temperature sensing probe 12 in similar fashion. The output signal 26 of the comparison standard oscillator 14 is subject to variation due to driving gas pressure variations only while the output signal 28 of the temperature sensing probe 12 is subject to variations in both driving gas pressure and probe temperature.

The electrical output signals represented by arrows 26 and 28 are amplified to a level suitable for multiplicative mixing by amplifiers 30 and 32 respectively.

The output signals of the amplifiers 30 and 32, being either electrical voltages or currents, are fed to a multiplicative mixer 34 of any suitable type well known in the art and multiplied together therein. This operation, sometimes referred to as frequency conversion or frequency translation, produces two resulting mixer output signal components, one component whose frequency is the sum of the two mixer input signal frequencies, the other component whose frequency is the difference between the two mixer input signal frequencies. The output circuit of the mixer 34 is tuned to the latter signal. The former signal is effectively attenuated by the filtering action of the output circuit of the mixer 34. The output signal of the mixer 34 therefore has a frequency equal to the difference between the two mixer input signal frequencies, and is represented by an arrow 36. The frequency of the mixer output signal 36 is detected by any means well known in the art such as, for example, by feeding it to a frequency counter 38 wherein the difference frequency can be visually noted or graphically recorded.

Since the driving gas pressure variation at the input of both the temperature sensing probe 12 and the comparison standard oscillator 14 is the same, the frequency change in the output signals, represented by the arrows 26 and 28, due to pressure variation is likewise the same. Operation of the mixer 34 cancels these pressure induced frequency changes such that only the relative temperature difference between the oscillator 14 and the probe 12 is reflected by the frequency of the mixer output signal, represented by the arrow 36.

Wide pressure variations are therefore compensated for so long as driving gas pressure variations are not so large as to exceed the response capabilities of the temperature sensing probe 12 or the comparison standard oscillator 14. The arrangement of the driving gas input orifice 40, resonant cavity 42, and position and configuration of the transducer 24 in the comparison standard oscillator 14 are shown for illustrative purposes only. It is to be recognized that other arrangements and configurations are possible without departing from the spirit and scope of the present invention.

The temperature sensing system is calibrated by any suitable means well known in the art such as by tabulating the frequency recorded by the counter 38 corresponding to each of a series of known probe temperatures. The temperature of the oscillator 14 is maintained at a known value throughout the procedure. The resulting tabulation of frequencies thus corresponds to known probe temperatures so long as the oscillator temperature is the same as when the system is calibrated.

Although the present invention has been described with respect to specific details of certain embodiments thereof, it is not intended that such details be limitations upon the scope of the invention.

I claim:

1. A system for eliminating temperature sensing errors caused by gas pressure variation comprising a gas driven temperature sensing system, said system having an output signal whose frequency is a function of gas temperature and driving gas pressure, a gas driven temperature comparison standard, said comparison standard having an output signal whose frequency is a function of gas temperature and driving gas pressure, means for supplying a driving gas to said temperature sensing system and comparison standard from a common source, means for maintaining said comparison standard and the driving gas therein at the same temperature, said temperature being fixed, and means for detecting the difference in frequency between the output signals of said temperature sensing system and comparison standard, said difference in frequency being a function of the temperature difference between said temperature sensing system and comparison standard, variations in the frequencies of said output signals caused by driving gas pressure variation being cancelled thereby.

2. The system of claim 1 wherein said means for maintaining said comparison standard and the driving gas therein at the same temperature, said temperature being fixed, comprises a heat exchanger interposed between said source and comparison standard, and a constant temperature oven enclosing said heat exchanger and comparison standard.

3. The system of claim 1 wherein said means for detecting the difference in frequency comprises a mixer, wherein the product of said output signals is obtained, one component of said product being a signal whose frequency is equal to the difference in frequency between said output signals.

4. The system of claim 3 wherein said means for detecting the difference in frequency further comprises a frequency counter.

5. A method of eliminating temperature sensing errors caused by gas pressure variation, the steps of which comprise supplying a gas from a gas source to a gas driven temperature sensing system, said temperature sensing system producing an output signal whose frequency is a function of gas temperature and driving gas pressure, supplying a gas from said gas source to a gas driven temperature comparison standard, said comparison standard producing an output signal whose frequency is a function of gas temperature and driving gas pressure, maintaining the temperature of said comparison standard and the driving gas therein at the same temperature, said temperature being fixed, and detecting the difference in frequency between the output signals of said temperature sensing system and comparison standard, said difference in frequency being a function of the temperature difference between said temperature sensing system and comparison standard, variations in the frequencies of said output signals caused by driving gas pressure variation being cancelled thereby.

References Cited

UNITED STATES PATENTS

| | | | |
|---|---|---|---|
| 2,582,232 | 1/1952 | Cesaro et al. | 73—339 |
| 3,229,501 | 1/1966 | Henze et al. | 73—24 |

LOUIS R. PRINCE, Primary Examiner

DENIS E. CORR, Assistant Examiner

U.S. Cl. X.R.

73—339